Figure 1:
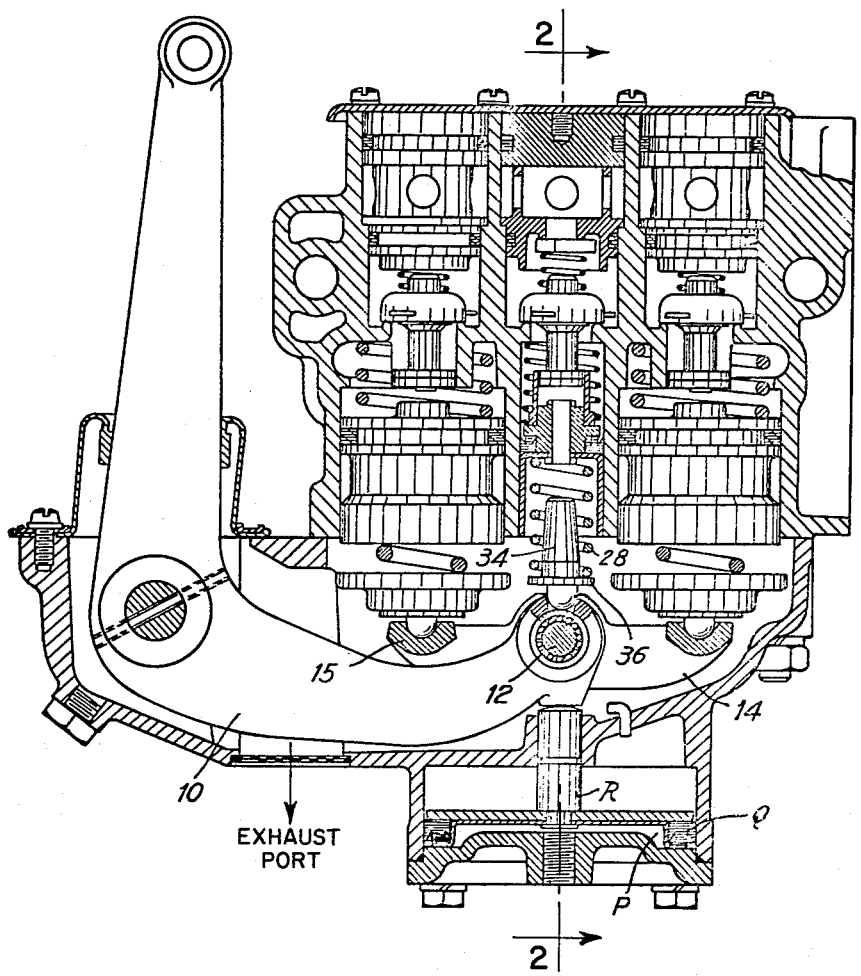

Sept. 7, 1965
G. ALFIERI
3,205,021
BRAKING ARRANGEMENT WITH A PAIR OF SUBSEQUENTLY
OPERATED BRAKE INITIATING MEANS
Filed May 27, 1963
2 Sheets-Sheet 1

INVENTOR
Giuseppe Alfieri

BY
Stevens, Davis, Miller & Mosher
ATTORNEYS

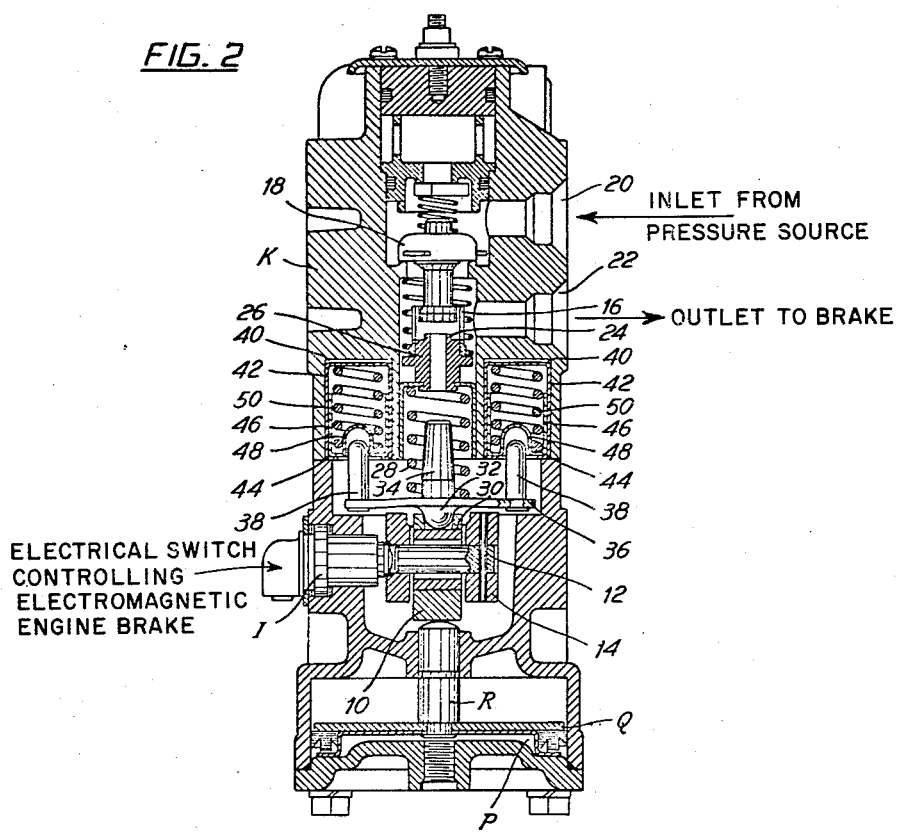
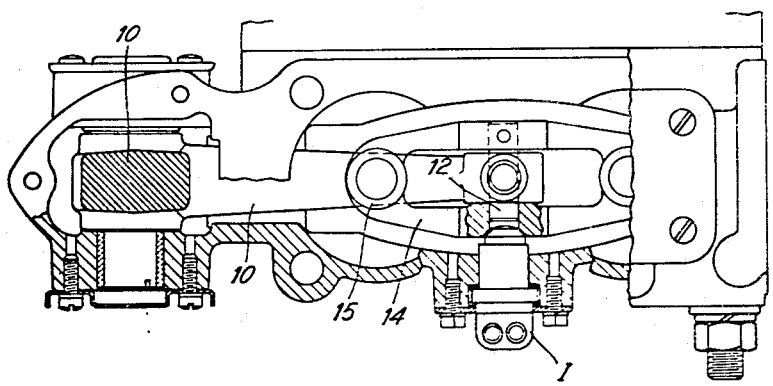

United States Patent Office 3,205,021
Patented Sept. 7, 1965

3,205,021
BRAKING ARRANGEMENT WITH A PAIR OF SUBSEQUENTLY OPERATED BRAKE INITIATING MEANS
Giuseppe Alfieri, Milan, Italy, assignor to Fabbrica Italiana Magneti Marelli S.p.A., a corporation of Italy
Filed May 27, 1963, Ser. No. 283,283
Claims priority, application Italy, June 6, 1962, 11,190/62
3 Claims. (Cl. 303—53)

The present invention relates to improvements in a device for pneumatic braking distributors, for the application particularly to pneumatic distributors of duplex or triplex type. The present invention constitutes an improvement over the inventor's earlier U.S. Patent 3,085,835.

Such device, which can be applied to pneumatic distributors provided preferably with electro-mechanic members, for actuating in advance the braking means of the engine of the vehicle and which is constituted by at least a power accumulator, located in a pre-loaded condition, between the element connecting kinematically the control pedal of the distributor and the movable part of the latter, is characterized in that, in combination with the rocking lever of the distributor, comprises means for actuating, in due sequence, the power accumulators which signal to the user the operation of the brakes for the wheels of the vehicle.

In a preferred embodiment of the invention, the rocking lever of the distributor comprises a complementary rocking lever, whose oscillation plane is normal to the oscillation plane of said first rocking arm, and is provided, at its ends, with pins appropriately spaced from bottom cups associated with spring means, whose contrasting action is introduced in the kinematic link leading to the operating pedal of the distributor, when the means controlling the feeding of the brakes actuating pneumatic members are actuated.

The complementary rocking lever is conveniently comprised in or associated with the intermediate element interposed between the main rocking lever and the return spring means, which bring back said rocking lever in its rest position.

The invention will be now set forth in the following specification, with reference to the enclosed drawings in which like references refer to like parts which illustrate, by way of exemplification, a preferred embodiment of the device, as applied to a triplex distributor, of which:

FIG. 1 is a vertical-sectional view;
FIG. 2 is a transverse sectional view along line 2—2 of FIG. 1; and
FIG. 3 is a plan view partially in section.

In the distributor, the three sections are actuated by a rocking lever 10 pivotally held, through a pin 12, by a fork 14 presented at the end of an L-shaped lever, not illustrated, with which connects the kinematic link leading to the actuating pedal of the distributor. In such figure is illustrated only the intermediate section, while the other two sections have been not illustrated, being similar to the considered one. Each of such sections comprises, in a known manner, a pre-inlet valve 16 solid with an inlet valve 18, the latter controlling the passage of air from an inlet connection 20 to an outlet connection 22, the latter connection leading to the vehicle wheel brake actuating pneumatic members. With the valve 16–18 cooperates a bored push rod 24 provided by a piston 26 tightly sliding in a related cylinder and which is actuated, by means of a spiral spring 28, by the rocking lever 10 previously considered.

According to the present invention, such rocking arm in the intermediate part thereof foresees a housing 30 for a part-spherical head 32, solid with a plunger 34, which holds the lower end of the spring 28 previously considered.

The part-spherical head 32 is provided with a crosspiece 36 which extends for an equal length from both sides of said head, in order to form a complementary rocking lever, whose longitudinal axis lies in a plane normal to the plane of the longitudinal axis of the rocking lever 10.

Such complementary rocking lever foresees, at the ends thereof, the pins 38 ending with part-spherical heads for the purposes that will be described hereinafter.

In considering the cross-sectional view of the distributor, it can be seen that in the same, laterally to the intermediate distributing section, cylindrical chambers 40 are provided in which is located a cap 42, whose edge 44 is inwardly turned. Inside such cap is slidingly disposed a bottom cup 46, provided in its central part with a recess 48 for housing the end of the related pin 38.

In the cap 42 is disposed a spring 50, held at the other end, by the bottom cap 46. Both of these springs are disposed in the related caps and bottom cups, in a state of appropriate pre-compression and are firmly held in such condition by the inwardly turned edge 44 of each cap.

The distributor is then completed, also in a known manner, by an electric switch I, which actuates an electromagnet for braking the engine of the vehicle causing simultaneously the lighting of the stop lamp. The engine braking may be by any of the well known means such as closing a valve in the exhaust duct.

In the considered case, the movable part of the switch I engages the hole of the plug 12 and under this condition the switch is open, while when the distributor is actuated, the switch is closed. Furthermore and also in a known manner, the rocking lever 10 can be actuated pneumatically by sending compressed air in chamber P by means of a piston Q which acts through the stem R on said rocking lever 10.

It is evident from what is said hereinbefore, that when the rocking lever is actuated, in the first portion of the stroke, it closes the switch I, energizing the means for braking the engine of the vehicle. The rocking lever 10, in continuing its upward displacement, compresses the springs 28 related to the elementary distributing sections, while, on the other end, causes the engagement of the end of the pins 38 with the bottom of the recess 48.

The further displacement of such rocking lever is effected by overcoming the action of springs 28 and the action of springs 50, which springs, conveniently graduated, signal to the user the intervention of the pneumatic brakes of the vehicle, since, under these conditions, the plunger 24 of each distributing section (or better the plunger 24 of the advanced distributing section) engages the supply valve 16–18, by intercepting the communication between the atmosphere and connection 22, thus establishing, on the other hand, the communication between said connection 22 and connection 20, so as to feed the braking members.

It is evident that the device described and illustrated can foresee modifications and variations without departing from the limits of the present protection. It must be considered that the present device is of easy and simple realization and of sure and efficient operation, since the action of the contrasting power accumulator, results applied on the axis of the rocking lever 10 and therefore in a balanced position so that the action of said device is always perceived, whatever the operating conditions of the distributor may be and being the distributor of duplex or triplex type.

Obviously the present protection covers, also, the distributor embodying the considered device.

Various rearrangements and modifications may be made in the present invention without departing from the

I claim:

1. In a distributor for pneumatic braking systems, a device for signalling to the vehicle operator the intervention of engine braking means and wheel braking means, said distributor comprising a casing having at least two sections, a plurality of first and second ports in a first section connecting said casing to a pneumatic pressure source and a pneumatic wheel braking means respectively, a plurality of aligned valve means within said first section disposed between said ports, said valve means being spring biased to a normally closed position preventing communication between said ports, a normally open switch mounted in a second section of said casing, said switch upon closing energizing means for engine braking, a first rocking lever operatively connected to said valve means and mounted within said casing, a second rocking lever mounted on said first rocking lever with its longitudinal axis in a plane normal to the plane of the longitudinal axis of the first rocking lever, a kinematic link operatively connected between a vehicle brake pedal and said first rocking lever, a plurality of first spring means mounted to oppose motion of said first rocking lever, a plurality of second spring means disposed in said normal plane mounted to oppose motion of said second rocking lever, means connected to said first rocking lever for closing said switch and opening said valve whereby when said brake pedal is depressed, said kinematic link causes said first rocking lever to rock and sequentially overcome said first spring means, close said switch, said second rocking lever to overcome said second spring means, and open said valve thereby signalling the operator of the sequential engagement by the increasing resistance to brake pedal movement.

2. In a distributor for pneumatic braking systems, a device for signalling to the vehicle operator the intervention of engine braking means and wheel braking means, said distributor comprising a casing having at least two sections, a plurality of first and second ports in a first section connecting said casing to a pneumatic pressure source and a pneumatic wheel braking means respectively, a plurality of aligned valve means within said first section disposed between said ports, said valve means being spring biased to a normally closed position preventing communication between said ports, a normally open switch mounted in a second section of said casing, said switch upon closing energizing means for engine braking, a first rocking lever operatively connected to said valve means and mounted within said casing, a second rocking lever mounted on said first rocking lever with its longitudinal axis in a plane normal to the plane of the longitudinal axis of the first rocking lever, a kinematic link operatively connected between a vehicle brake pedal and said first rocking lever, a plurality of first spring means mounted to oppose motion of said first rocking lever, a plurality of second spring means disposed in said normal plane mounted to oppose motion of said second rocking lever, said second spring means being disposed within bores in said casing, said second spring means being retained within said bores by overturned edges of said bores, pins mounted on the ends of said second rocking lever for engaging and compressing said second spring means within said bore, means connected to said first rocking lever for closing said switch and opening said valve whereby when said brake pedal is depressed, said kinematic link causes said first rocking lever to rock and sequentially overcome said first spring means, close said switch, said second rocking lever to overcome said second spring means, and open said valve thereby signalling the operator of the sequential engagement by the increasing resistance to brake pedal movement.

3. In a distributor for pneumatic braking systems, a device for signalling to the vehicle operator the intervention of engine braking means and wheel braking means, said distributor comprising a casing having at least two sections, a plurality of first and second ports in a first section connecting said casing to a pneumatic pressure source and a pneumatic wheel braking means respectively, a plurality of aligned valve means within said first section disposed between said ports, said valve means being spring biased to a normally closed position preventing communication between said ports, a normally open switch mounted in a second section of said casing, said switch upon closing energizing means for engine braking, a first rocking lever operatively connected to said valve means and mounted within said casing, a second rocking lever mounted on said first rocking lever with its longitudinal axis in a plane normal to the plane of the longitudinal axis of the first rocking lever, said first rocking lever pivotally engages said second rocking lever through a semi-spherical head, a kinematic link operatively connected between a vehicle brake pedal and said first rocking lever, a plurality of first spring means mounted to oppose motion of said first rocking lever, a plurality of second spring means disposed in said normal plane mounted to oppose motion of said second rocking lever, means connected to said first rocking lever for closing said switch and opening said valve whereby when said brake pedal is depressed, said kinematic link causes said first rocking lever to rock and sequentially overcome said first spring means, close said switch, said second rocking lever to overcome said second spring means, and open said valve thereby signalling the operator of the sequential engagement by the increasing resistance to brake pedal movement.

References Cited by the Examiner

UNITED STATES PATENTS

| | | | |
|---|---|---|---|
| 2,812,218 | 11/57 | Fitch et al. | 303—54 |
| 3,004,549 | 10/61 | Temple | 251—14 X |
| 3,065,998 | 11/62 | Alfieri | 11—62 |

FOREIGN PATENTS 344,593   3/60   Switzerland.

MILTON BUCHLER, *Primary Examiner.*

FERGUS S. MIDDLETON, *Examiner.*